US008233624B2

(12) United States Patent
Ollikainen et al.

(10) Patent No.: US 8,233,624 B2
(45) Date of Patent: Jul. 31, 2012

(54) METHOD AND APPARATUS FOR SECURING DATA IN A MEMORY DEVICE

(75) Inventors: Ville Ollikainen, Vihti (FI); Harri Rautio, Tuusula (FI); Juuso Pesola, Helsinki (FI); Juhani Latvakoski, Haukipudas (FI)

(73) Assignee: Splitstreem Oy, Vaanta (FI)

( * ) Notice: Subject to any disclaimer, the term of this patent is extended or adjusted under 35 U.S.C. 154(b) by 1044 days.

(21) Appl. No.: 12/125,338

(22) Filed: May 22, 2008

(65) Prior Publication Data

US 2008/0301775 A1    Dec. 4, 2008

(30) Foreign Application Priority Data

May 25, 2007  (FI) ..................................... 20070414
Sep. 27, 2007  (FI) ..................................... 20070734

(51) Int. Cl.
*G06F 21/00* (2006.01)
*H04L 9/12* (2006.01)
(52) U.S. Cl. ........................ 380/262; 713/193
(58) Field of Classification Search ............ 726/2–4, 726/21, 26–30; 713/189, 193, 194, 179; 709/231; 711/E12.091, E12.093, 100, 161–164; 380/28, 255, 258, 262, 268
See application file for complete search history.

(56) References Cited

U.S. PATENT DOCUMENTS

| | | | |
|---|---|---|---|
| 7,187,771 B1 * | 3/2007 | Dickinson et al. | 380/228 |
| 2004/0049687 A1 * | 3/2004 | Orsini et al. | 713/189 |
| 2005/0096124 A1 * | 5/2005 | Stronach | 463/25 |
| 2005/0108414 A1 * | 5/2005 | Taylor et al. | 709/231 |
| 2005/0240749 A1 * | 10/2005 | Clemo et al. | 711/170 |
| 2007/0160198 A1 * | 7/2007 | Orsini et al. | 380/28 |
| 2007/0208834 A1 * | 9/2007 | Nanamura et al. | 709/220 |
| 2008/0137857 A1 * | 6/2008 | Bellare et al. | 380/255 |
| 2008/0183992 A1 * | 7/2008 | Martin et al. | 711/162 |
| 2008/0244277 A1 * | 10/2008 | Orsini et al. | 713/193 |
| 2010/0146288 A1 * | 6/2010 | Tune | 713/179 |
| 2011/0173676 A1 * | 7/2011 | Peckover | 726/3 |

* cited by examiner

*Primary Examiner* — Gilberto Barron, Jr.
*Assistant Examiner* — Abdulhakim Nobahar
(74) *Attorney, Agent, or Firm* — Shalom Wertsberger; Saltamar Innovations (57) ABSTRACT

A Method and a terminal intended for securing information in a local memory device which is couplable to a terminal having a data link interface. At the terminal, the method comprises the following steps. The method divides 801 original data included in the information to be secured, a division of the original data resulting in a first portion and a second portion. The method stores 802 the first portion in the local memory device and sends 803 the second portion via the data link interface for storage in a remote memory device. The method includes obtaining 804 an authorized read request targeted to the original data and responsive to the authorized read request reconstructs the original data. In more detail, the method retrieves 805 via the data link interface the second portion and combines 806 the second portion and the first portion which was stored in the local memory device. The method provides very high data security if the data, from which the second portion is removed, is encrypted prior to the step of dividing 801. Another aspect of the invention comprises a terminal capable of at least combing the first and second data portions to reconstruct the original data, and preferably to perform the step required for dividing the data. The data may or may not be encrypted.

20 Claims, 6 Drawing Sheets

METHOD AND APPARATUS FOR SECURING DATA IN A MEMORY DEVICE

FIELD OF THE INVENTION

The invention relates in general to data security in mobile terminals and portable memory devices. More particularly the invention relates to data security in devices that may be exposed to unsupervised physical access. The invention also relates to access management of data.

BACKGROUND OF THE INVENTION

Mobile terminals, such as mobile phones, laptop computers (colloquially known as 'laptops'), and PDAs, often contain sensitive data. The memory available in premium mobile phones today exceeds a hard disc size of a typical PC ten years ago. Today mobile phones can be used as audio, video and image storage, and as a calendar, a phone book, or a notepad. They may contain personal, company confidential, or other sensitive data. Until today, the interest in securing data stored in mobile phones against unauthorized use has been almost non-existent. Data security of laptops can be implemented by ciphering theirs hard disks, but very often the data security depends on physical access to the laptop. As mobile terminals have become smaller in size, they also became more prone to loss and theft.

Some mobile terminals may comprise dedicated processing units for telecommunication purposes and applications, but usually a plurality of similar processing units perform both functionalities. The processing units are typically controlled by a multi-tasking operating system, such as Symbian, Windows Mobile or Mobile Linux, and the like.

A memory used in a mobile terminal is termed in this application a Mobile Terminal Memory (MTM). The MTM can be expanded, for example, by connecting portable memory devices, Compact Flash cards, Secure Digital memory, and the like, into a mobile terminal. Memory cells included in the MTM are often based on Solid-state Flash technology. In addition or alternatively, the MTM may comprise a hard disk drive. The term MTM relates to any such memory device which is accessed by at least one mobile terminal. The term "access" should be construed to mean that data can be at least read from, and preferably written into the MTM.

Use of an MTM commonly requires that an appropriate file system driver is installed in a mobile terminal. The file system driver provides user access to data stored in the MTM.

An operating system of the mobile terminal commonly makes the MTM appear like file system similar to an ordinary disk drive. In almost all file systems, data is stored in blocks which are mapped to physical memory addresses, such as memory addresses of the MTM.

There exist encryption systems where encryption of data is performed using an encryption key. Correspondingly, the encrypted data is decrypted with a decryption key. Data stored in the mobile terminal can be encrypted either in a stream cipher mode or a block cipher mode.

In the block cipher mode the encryption is performed in a non-chaining manner or a chaining manner. In the non-chaining manner the encryption is independent from the results of the previous encryption operations, whereas in the chaining manner, previous encryption operations set a certain initial state for a subsequent encryption.

In the stream cipher mode, previous encryption operations set a certain initial state for a subsequent encryption. In other words, the subsequent encryption is dependent on results of the previous encryption operations.

By way of example, the following encryption methods are well known: TEA or 18Crypt for ciphering in the stream cipher mode, AES, DES, ECB, or XXTEA for ciphering in the block cipher mode in the chaining manner, and CBC, CBF, CBCC, or OFB for ciphering in the block cipher mode in the non-chaining manner.

In addition to mobile terminals, portable memory devices suffer from data security risks. Portable memory devices are also known as removable memory devices. A portable memory device (PMD) can be coupled to a mobile terminal, workstations, and other data processing equipment.

A USB memory device (colloquially known as a USB 'stick', disk on key, memory 'stick', and the like.) is a typical example of the PMD. USB memory sticks have replaced many floppy and CD-RW disks as removable media. Other kinds of PMDs are also known, such as Compact Flash cards Secure Digital memory sticks, and the like.

Memory cells included in a PMD are usually based on the Solid-state Flash technology. In this application the PMD means a memory device which can be removed from a computer or mobile terminal without tools.

Use of the PMD requires that an appropriate file system driver is first installed in the computer. After that the PMD is accessible through the computer. Like the MTM, the PMD usually appears to the user as an ordinary disk drive.

Commonly disk drives are formatted prior to storing file data thereupon. During formatting, a file system is created onto the disk. In Windows XP a typical file system is NTFS or FAT32, while in Linux EXT2 is common. In most file systems in common use today, a formatted disk drive file system contains an empty root directory. Then directories, subdirectories can be created on the disk drive and files can be stored in the created directories and subdirectories. It is important to understand that directories, files, and the like are conceptual groupings of data, organized into a file system by specifications and dully interpreted by a control program such as an operating system, and that the storage method within the device or disk drive may be organized independently of the data interpretation, while still falling under the scope of the present invention.

The term data link shall be used in this application to denote the broad concept of capacity to communicate data between at least two data processing capable units, over wired or wireless communication methods. The concept of a data link is immaterial of the specific communication protocol, physical medium, and method applied, and thus, by way of a non-limiting example extends to, all wired communication networks, a wireless network, such as a packet switched mobile data network usually referred as 2.5G, 3G or 3.5G mobile networks, or wireless IP networks such as Wi-Fi, WiMAX or any combination thereof n thereof, as well as to local data links such as USB, various serial and parallel communications links, IEEE1394, and the like. Similarly, it is noted that the term network should be given a broad spectrum to include all manners of communication media, including hardware and software, that will allow two computing devices to communicate there between By way of example, such networks include wired and wireless networks, cellular networks, satellite networks, packet switched networks, telephony networks, and they like.

PMDs are very practical in carrying personal or company data. Typical capacity of a flash-memory based PMD is 1-4 GB, but also 16 GB versions already exist, and capacities are expected to increase. The flash-memory based PMD is lightweight, small-sized, and has proven to be more reliable than its predecessors, floppy disks.

The invention relates in general to Local Memory Devices (LMD devices). Both MTM and PMD are examples of such LMD devices.

The prior art LMDs suffer from several problems. A data management problem is one those problems. The data management problem mostly concerns the PMDs but also the MTMs.

One common PMD data protection scheme involves setting an unprotected and a protected partition on the memory device. The unprotected partition contains a special driver through which the protected partition is accessible. When the special driver is installed (permanently of temporarily) in a computer, a user must input a correct password in order to access data stored on the protected partition.

Other protection methods exist, too, such as coupling a fingerprint reader into the PMD. Then the information of the PMD is accessible only after a detection of a correct fingerprint.

None of these methods protect the data in certain cases. By way of a simple example when an employee who properly received the device has left the company. The employee can still read the company confidential information stored in the PMD, although he/she may not be entitled to do so any more.

A basic problem related the prior art LMDs is data security. It is possible to use the strongest encryption method available. However, if an unauthorized person who wants to abuse encrypted information of an LMD has enough time and processing capacity, he/she can break the encryption of the information. Even the strongest encryption is breakable.

Most encryption methods are based on use of an encryption key. Some encryption methods, such as PGP, need two keys per a person. In more detail, the person has a private key and a public key. A known problem related to the encryption methods is key management, i.e. persons and organizations have difficulties to manage a number of encryption keys.

It should be noted that while there are numerous encryption methods, most of the methods diffuse the incoming data, i.e. changing one bit of input data causes a change to more than one bit of output data. As far as the invention is concerned, these encryption methods are of special interest. In fact all methods which have a property of diffusing data can be considered as encryption in the present context.

SUMMARY OF THE INVENTION

An objective of the invention is to solve the above-mentioned problems and secure data stored in a local memory device (LMD).

An advantage of the preferred embodiment of the invention is that at least a portion of the data to be secured is stored in a remote memory device (RMD). The missing portion of data makes breaking the encryption very difficult.

Optionally, the portion to be stored in the RMD is extracted from encrypted data. In more detail, the original data is encrypted resulting in the encrypted data from which the portion to be stored in the RMD is extracted. Then breaking the encryption even more difficult.

An advantage of the preferred embodiment of the invention is that if encryption is used, a user of the terminal does not have to remember or use any encryption key.

In the preferred embodiment, a terminal has an open access to the LMD, but not to the RMD. The access to the RMD is controlled and previously granted access rights to the RMD can be cancelled.

Yet another advantage of the preferred embodiment is that if the access rights to the RMD are missing, the content of the data portion stored in the LMD is illegible.

Thus, the present invention is directed to providing access control to the RMD. To that end, there is provided a method for securing information in the LMD couplable to the terminal having a data link capability to the RMD, the method comprising the steps of:

dividing at the terminal original data included in the information to be secured into at least two portions, the division of the original data creating a first portion and a second portion;

storing the first portion in the LMD;

storing the second portion in the RMD;

receiving an authorized read request targeted to the original data; propensity responsive to the authorized read request, retrieving via the data link the second portion; and, combining the portions including the first portion stored in the LMD and the retrieved second portion, the combination of the portions reconstructing the original data.

In yet another aspect of the present invention, there is provided a terminal for securing information in a local memory device, the terminal comprising a data link interface; a device driver capable of storing data in a local memory device; a bitstream divider capable of dividing the information into a first and a second data portions, storing the first data portion in the local memory device utilizing the device driver, and of sending the second data portion utilizing the data link interface for storage in a remote storage; a bitstream combiner capable of, responsive to authorized read operation request, retrieving the first data portion from the local memory device, and retrieving the second data portion from the remote storage, and combining the first and second data portions, obtaining a reconstruction of the original information. In an optional embodiment, the terminal is equipped for decrypting the information.

Preferably, the authorized read operation requires a successful access rights authentication via the data link.

Optionally, the terminal further comprises a pseudorandom number generator capable of generating identical pseudorandom bitstream in response to identical seed data input, wherein the selection of data to be divided into the first or second portion is performed utilizing the pseudorandom bitstream. Further optionally, the data link interface is capable of sending all, or a portion of the seed data or the pseudorandom bitstream to the remote memory device; and the data link interface is further capable of receiving all or the portion of the seed data or the pseudorandom bitstream from the remote memory device, responsive to an authorized read operation; and the bitstream combiner regenerates the seed data and/or the original data utilizing the received part of the seed data or the pseudorandom bitstream.

Preferably, the terminal further comprises an encryptor coupled to the input of the bitstream divider, for encrypting the original data prior to feeding the data to the bitstream divider; and a decryptor coupled to the output of the data combiner, for decrypting the output of the data combiner, wherein the decryptor requiring decryption data to decrypt data from the data combiner. Using such embodiment allows for optional features wherein the data link interface is capable of sending at least a part of the decryption data for storage in the remote memory device; and, wherein the data link interface is capable of receiving the part of the decryption data from the remote memory device responsive to the authorized read operation.

Optionally, the device driver is capable of erasing data from the local memory device. The device driver may erase the data when an expiration time associated to the local memory device is reached, in response to an authorized erasure command received via the data link, or the like.

As the skilled in the art will recognize, certain portions of the invention structure, and the functionality associated therewith may be implemented by varied software and hardware combinations. Similarly, the structure may be implemented by more than a single processing unit, by dedicated processing units such as application specific circuitry, programmable logic, and the like, and the invention extends to all such constructs. Therefore, the terminal may comprise at least one processing unit operating under software control, wherein at least one component selected from the least consisting of the data combiner, the data divider, the encryptor, the decryptor, and the device driver, or portions or combinations thereof, are implemented utilizing the processing unit.

DETAILED DESCRIPTION OF THE INVENTION

In addition to a local memory device (LMD), which can be a mobile terminal memory (MTM) or a portable memory device (PMD), the invention also concern use of a remote memory device (RMD).

The RMD can be considered as a memory device accessible over a telecommunication network from a plurality of locations. The RMD may thus be, for example, a network file server which a user may access using a data link. To increase readability and assist understanding, the examples provided in these specifications concentrate on IP based networks, thus the general concept of the data link shall be embodied as IP networks only by way of non-limiting example.

Whereas an IP network provides lower data transfer layers of the known OSI model, upper level methods are required for accessing data. There are some known methods for accessing data from a network file server over the IP network. For example, Service Oriented Architecture Protocol (SOAP) provides a convenient data access method in a networked multi-platform environment.

Therefore, the following description of preferred embodiments of the present invention, as well as optional features thereof, are provided for increasing the understanding of the invention and should not be construed as limiting the invention.

Figure 1:
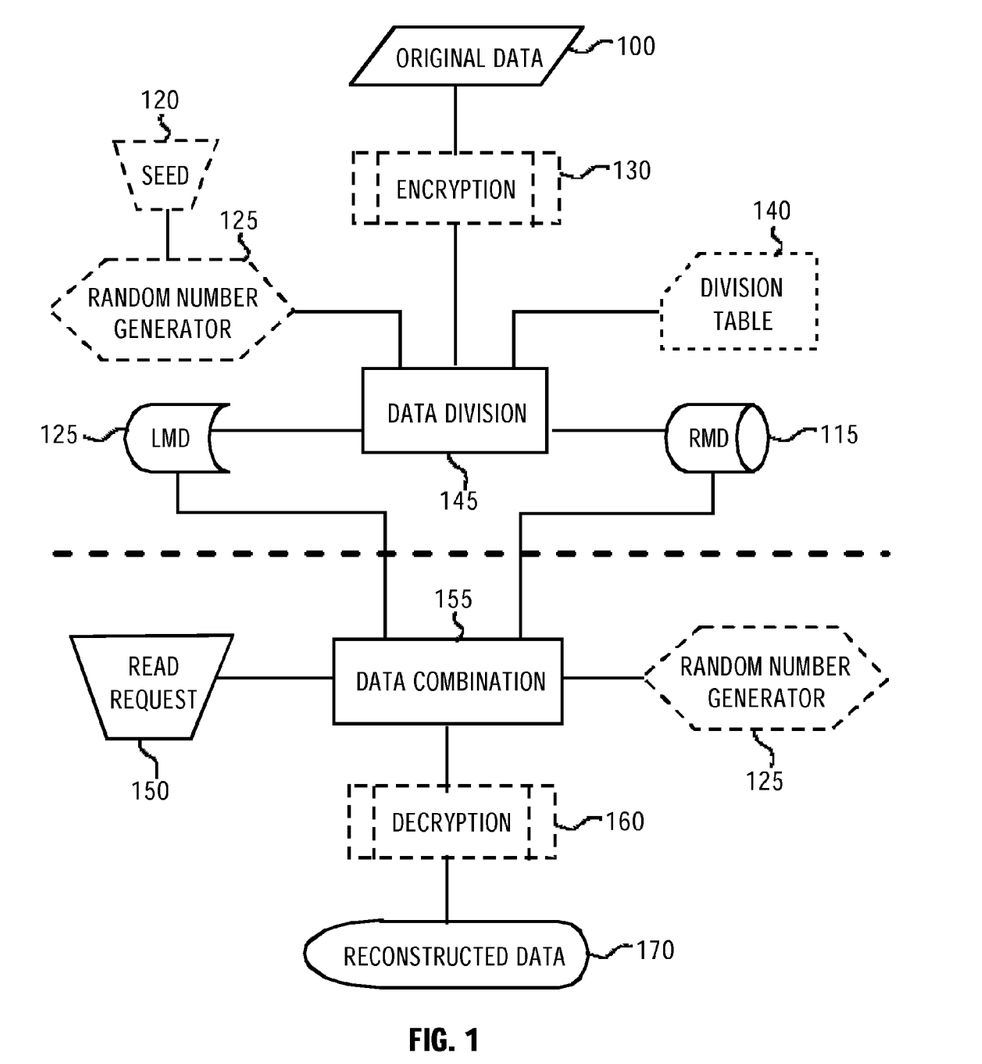
FIG. 1 depicts a simplified flow diagram embodying a general overview of the invention, including optional steps and components.

FIG. 1 depicts an overview flow diagram of operation of the present invention in a simple form. In the simplest form, original data 100 is divided 145 into at least two portions, a first is stored in LMD 125, and a second stored in an RMD 115, remote to the terminal. Upon a verified read request 150, data is retrieved from RMD 115 and from LMD 110 and is combined 155 to create reconstructed data 170.

Preferably, the data is encrypted 130 prior to storage. In the depicted embodiment the data is encrypted prior to the data division, but the skilled in the art will recognize that encryption may also occur after the data division. Clearly in order for the data to be reconstructed, a step of decryption 160 is required if the data was encrypted during storage.

Methods of selecting how the data will be divided are numerous, and the skilled in the art will recognize it as a matter of technical choice. By way of example a data division table 140 may be utilized, or a pseudo random bit sequence random number generator 125 may be utilized. Preferably the pseudorandom number generator is fed by a seed data 120, and generates identical pseudorandom bitstream responsive to identical seed data input. The pseudorandom bitstream is used to select which portions of the original data are to be stored locally and which are to be stored remotely.

The skilled reader will recognize that to easily recombine the data, the reverse of the data division is used, and thus for example, the random number generation optionally used for data division, may be used for data recombination.

Figure 2:
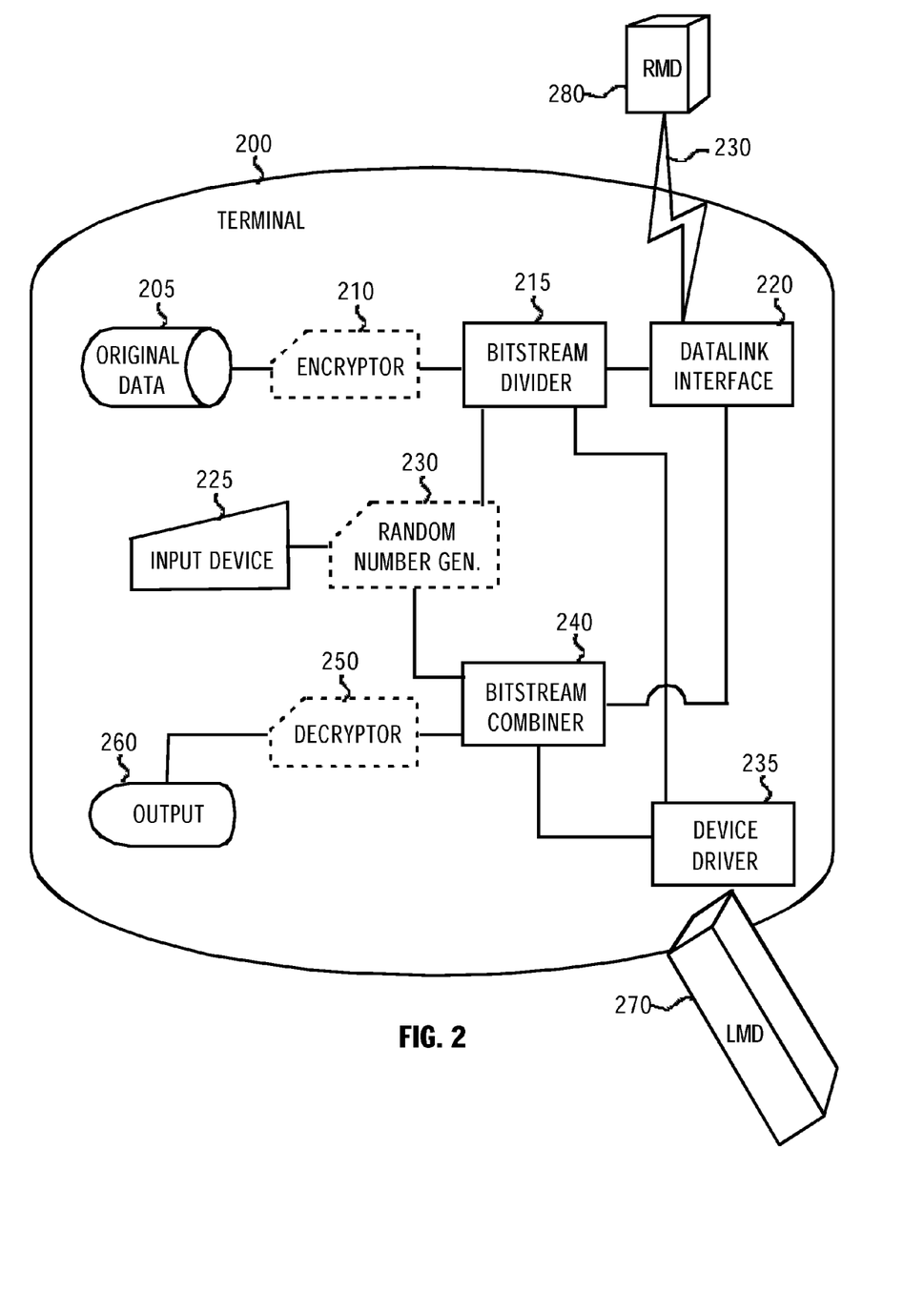
FIG. 2 depicts a simplified example of a block diagram of a terminal arrangement.

FIG. 2 depicts a simplified block diagram of a terminal 200 according to a preferred embodiment. Original data 205, which may or may not originate in the terminal, is fed to optional encryptor 210. Encryptor 210 is coupled to bitstream divider 215. Optional random number generator 231 is also coupled to bitstream divider 215. The output of the bitstream divider is coupled to the input of the data link interface 220 and to input of the LMD 270 device driver.

Data link interface should be construed to be any combination of hardware and software required to communicate to a data link at least a portion of the original data to a remote memory device RMD 280. Similarly, device driver 235 should be construed as the required software, and optionally hardware, required to access data in the local memory device LMD 270. Both the data link and the device driver should be considered to have an input and an output, where the input writes data directly or indirectly to the RMD and LMD respectively, and the input reads data directly or indirectly from the respective device. It is noted however that the data link may communicate with more than a single RMD, which will be considered as one.

The output of the data link interface 220 and of device driver 235 are coupled to bitstream combiner 240. If optional random number generator 231 is used, it will also be coupled to the bitstream combiner. The output of bitstream combiner 240 is fed to optional decryptor 250 and to terminal output 260, which may be a data link, a display, or any other output device.

The operation of encryptors, decryptors, device drivers, data links, random number generators, and the like, are well known in the art, and specific embodiments thereof shall only be discussed inasmuch as they disclose novel features in general, or when applied to the present invention.

It is also noted that various embodiments may be utilized to achieve the functionality of each of the blocks described. Thus for example each of the functional blocks described may be implemented in one or more processing units, dedicated electronic units, software, and any combination thereof. Coupling of data may occur directly or indirectly. Thus many of the functions described herein as different functional blocks may be carried out by a single processor, by cooperating circuitry, and the like. Similarly, software functionality may in many cases be performed by hardware and vice versa. Furthermore, if optional components described herein are not used, the skilled in the art will easily recognize how such components may be bypassed. Thus, by way of example, if the encryptor 210 and decryptor 250 are missing, the original data may be coupled to bitstream divider 215, and the output of the bitstream combiner 240 may be outputted without the missing optional component.

Figure 3:
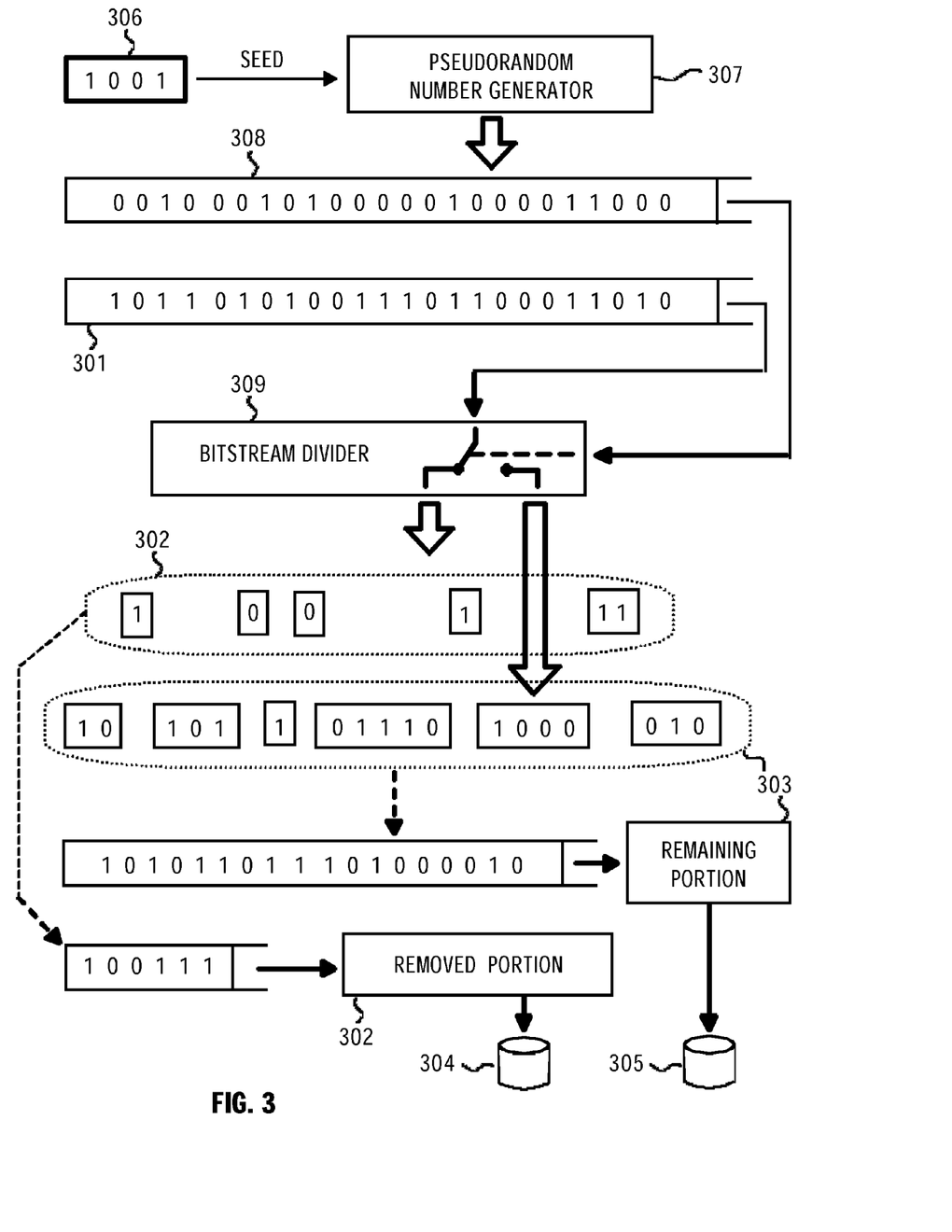
FIG. 3 illustrates a write operation and an operation of a bitstream divider.

FIG. 3 illustrates simplified write operation and the operation of a bitstream divider. When data is written to the LMD 305, a first portion 302 of the original data 301 is removed by bitstream division 309 and stored in the RMD 304. The remaining portion, i.e. a second portion 303 of the original data 301 is stored in the LMD 305. There are a number of methods for selecting the first portion 302, i.e. certain data items which are removed from the original data 301. Some of the selection manners are described below as examples.

One manner is based on use of a pseudorandom number generator 307 so that the pseudorandom number generator 307 defines the positions of data items to be removed from the original data. In response to inputting a seed number the pseudorandom number generator generates a pseudorandom bit stream 308, preferably with a pre-defined proportion of ones and zeroes. In fact, any algorithm producing a specific bit pattern in response to inputting the seed number can be considered as a pseudorandom number generator.

It should be noticed that instead of the seed number, the input data of the pseudorandom number generator 307 may also have a non-numerical format, for example, a format of a vector. We refer by the term "seed data" to any kind of the data inputted to the pseudorandom number generator 307.

It should be further noticed that the seed data, such as the seed number 306, can be omitted. Then pseudorandom number generator 307 generates pseudorandom numbers which are sent to the remote memory device to be stored therein. When the data portions need to be combined, the pseudorandom numbers are retrieved from the remote memory device and they are used in the combination of the data portions.

If the seed data is omitted, the pseudorandom bit stream 308 contains pseudorandom numbers. For example, CryptGenRandom( ) function included in Windows operating system can be used as the pseudorandom number generator 307 which outputs the pseudorandom numbers for the pseudorandom bit stream 308. CryptGenRandom( ) function preferably generates the pseudorandom numbers on the basis of time stamps or low-level events of the operating system.

In the method in accordance with the preferred embodiment, the second portion 303 of the original data 301 is stored in the LMD 305.

Figure 4:
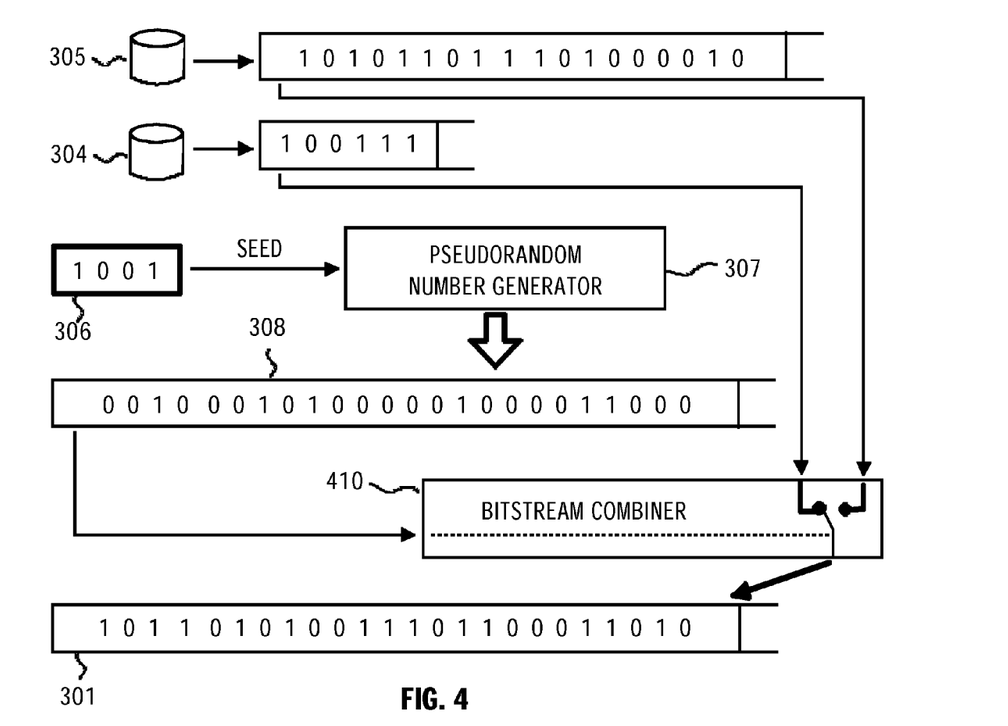
FIG. 4 illustrates a read operation and an operation of a bitstream combiner.

As an example, we may consider that the original data 301 is a text document and the write operation described in FIG. 3 is performed when a user of a terminal saves the text document. The read operation, which is described in FIG. 4, is performed when the same user or some other authorized user opens the text document in a text editor.

Optionally, we may consider that the original data 301 is automatically saved after a certain time period and also the write operation described in FIG. 3 is performed after this certain time period.

Further optionally, we may consider that the write operation is performed, if the user of the terminal is inactive. The user is determined to be inactive, if he/she has not given any command, such as a scrolling command, by a certain time limit.

When an authorized user of the LMD 305 wants to restore the original data 301 the read operation described in following figure is performed.

FIG. 4 illustrates a read operation and an operation of a bitstream combiner. First, the previously removed portion 302 of the original data 301 is retrieved from the RMD 304. If the seed number 306 for the pseudorandom bit stream 308 is stored in the RMD 304, the seed number 306 is also retrieved from the RMD. Secondly, during the bitstream recombination 410, the data items of the removed portion 302 are placed into their original positions by inputting the seed number to the pseudorandom number generator 307. Then the pseudorandom number generator 307 generates the same pseudorandom bit stream 308 which was used when the original data 301 was divided.

As mentioned in the above, the seed data or the seed number 306 can be omitted. In addition, the pseudorandom number generator can be omitted from the read operation. This is possible, if the pseudorandom numbers were sent during the write operation to the remote memory device to be stored therein. The pseudorandom numbers are retrieved for the read operation from the remote memory device and they are used in the combination of the data portions. In more detail, the pseudorandom bit stream 308 containing the pseudorandom numbers is an input of the bitstream recombination 410.

In accordance with bits of the generated pseudorandom bit stream 308 the bitstream recombination 410 uses bits either from the data portion stored in the RMD 304 or the data portion stored in the LDM 305. These data portions of RMD 304 and LMD 305 are preferably placed into buffers which are read independently bit-by-bit. This read manner ensures that the data stored in the LMD 305 remains incomplete, if the access to the RMD 304 is missing.

The pseudorandom bit stream 308 indicates the positions of the data items removed from the original data. The data portion to be stored in the RMD 304 is composed of the removed data items. Then, as response to an authorized read operation targeted to the original data, the data portion is retrieved from the RMD 304 and combined to the data portion stored in the LMD 305 resulting the original data 301.

The invention is not limited to use of the pseudorandom number generator 307. Instead of removing data in a pseudorandom manner, it is feasible and computationally less demanding to remove a fixed number of bits from the beginning of the block. Then neither the pseudorandom number generator 307 nor the seed number 306 are needed. Consequently, there is no need to store the seed number 306 to the RMD 304. As a drawback, the protection of the original data is weaker, especially when only few bits are removed from the original data 301.

As a compromise between security and computational challenge a pre-defined lookup table can be used so that a certain entry of the pre-defined lookup table is selected on the basis of a seed number. Then a bit stream corresponding to the pseudorandom bit stream 308 is obtained through this certain entry of the pre-defined lookup table. In other words, the pseudorandom number generator 307 can be replaced with the pre-defined lookup table.

It should be noticed that though the above-presented examples describe removing bit-by-bit the data portion from the original data, in most hardware platforms it is computationally more effective to remove data byte-by-byte, word-by-word, or in any data items larger than one bit.

In the above the original data 301 is divided into a first portion 302 and a second portion 303. Nevertheless, the original data can be divided into more than two portions. Similarly, a number of different network interfaces, connections, and data links can be used in a communication between the terminal and the RMD 304. Similarly, more than one RMD may be used, utilizing a single or a plurality of data links.

If a user possessing the terminal has no access rights to the RMD 304, the method blocks the user's data request operations targeted to the RMD and thus intentionally causes a failure in an attempt to restore the original data 301. In other words, the read operation of FIG. 4 fails. Therefore a certain person, such as a network administrator, has the capability to remotely disable and enable use of the information of the LMD 305 simply by setting the access rights of the user.

The access rights can be checked, for example, by requiring the user to input a username and a password. If the username and the password are correct and valid, the removed portion 302 is retrieved from the RMD 304, the original data 301 is restored, and the user is allowed to read or possibly write the original data or portions thereof.

In addition to the username and the password, there are a number of other known methods for checking the access rights. If required, validity of the access rights is dependent on date or a location of the user.

Removing a portion of the original data alone does not guarantee data security. Prior to removing portion of the data, some pre-processing, such as compression or encryption, improves security significantly.

Let as first assume that the original data 301 is a plaintext. This plaintext can be encrypted to increase the data security.

Figure 5:
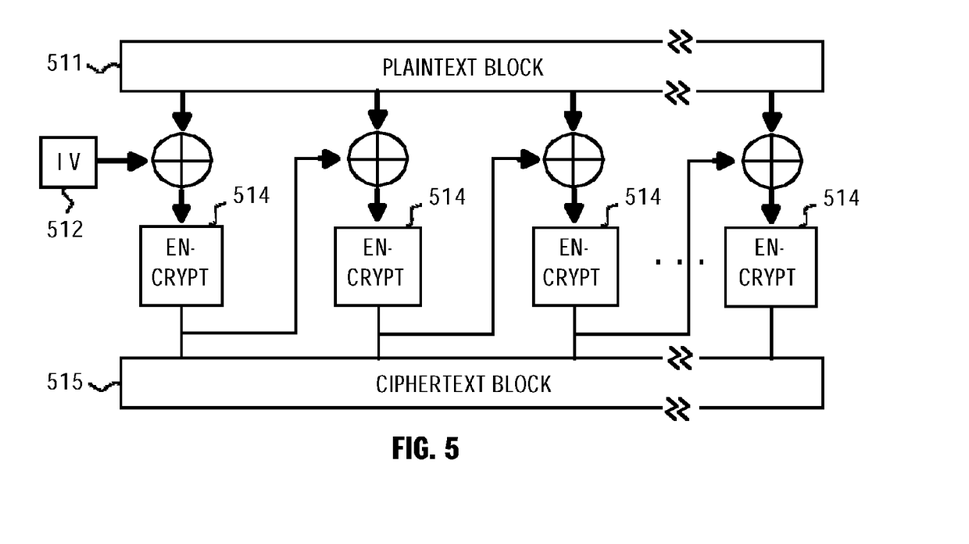
FIG. 5 depicts a second embodiment of the write operation.

FIG. 5 depicts a second embodiment of the write operation. Probably the easiest way to implement the invention is to use an open source platform, such as platforms based on Linux operating system. In the operating system a file system driver enables data transfers to and from the LMD. Usually, low-level read and write operations are targeted to fixed length data blocks. Because encrypting and decrypting the LMD requires significant processing capacity, the preferred method uses such low-level read and write operations which are targeted to entire data blocks.

The above-mentioned file system driver can be modified so that each block written into the LMD is modified. In addition, a portion of the ciphered data is stored in the RMD. This portion is transmitted to the RMD over a network, for example, over a mobile data network.

The original data to be secured is a plaintext 511. The plaintext 511 is encrypted using modules 514 for 128-byte chunks. Those modules perform the XXTEA encryption for the chunks of the plaintext 511. A first chunk is XOR'ed with an initialization vector 512 resulting in a chunk encryption. Then each chunk is XOR'ed with results of a previous chunk encryption. The encryption of the plaintext 511 results in the ciphertext 515.

The initialization vector 512 used in the XOR operation is preferably generated using a random number generator. The initialization vector can be stored in the LMD, but the encryption is stronger, if the initialization vector is stored with the portion of the ciphered data in the RMD.

Figure 6:
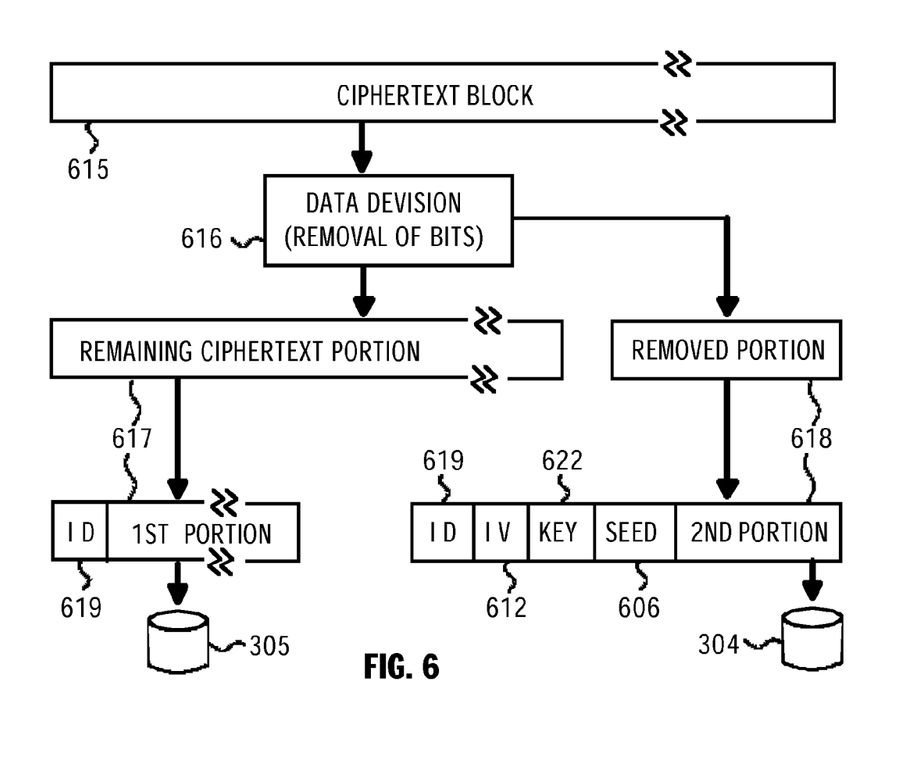
FIG. 6 depicts a third embodiment of the write operation.

FIG. 6 depicts yet another embodiment of the write operation. As in the previous example, the third embodiment calls for removing bits from a ciphertext 615 during the data division 616. The ciphertext 615 is composed of blocks. Preferably in this embodiment of the write operation, a proportion of the removed portion 618 to the remaining portion 617 is about 50% for a first data item of a block of the ciphertext 615 and about 1% for the subsequent data items of the block. When the data items are removed, all remaining bits are shifted towards the beginning of the block, causing a free space in the end of the block.

A unique ID number 619 is generated for each block of the ciphertext 615 and the unique ID number 619 is stored at the beginning of a block, and the block is written back to the LMD 305. If there is free space in the end of the block compared to the size of an original plaintext block, random data is generated and appended to the block so that the size of the block is the same as the size of the original plaintext block.

As shown in FIG. 6, the data division 616 of ciphertext 615 results in a remaining ciphertext portion 617, i.e. the first portion of the ciphertext 615, and the removed portion 618, i.e. the second portion of the ciphertext.

A copy of the unique ID number 619 is sent to the RMD 304 together with the initialization vector 612, encryption key 622 and the seed number 606 used in the data division 616. The removed portion 618 is associated with the unique ID number 619 in the RMD 304.

When reading data from the LMD 305, the unique ID number 619 is extracted from the read data. The missing data is retrieved from the RMD 304 on the basis the unique ID number 619. The removed portion 618 as well as the initialization vector 612, the encryption key 622, and the seed number 606, which are obtained from the RMD 304, are used for restoring the original data.

Pseudorandom number algorithms are commonly available in the literature. Preferably, such an algorithm should be chosen that always produces an identical sequence when the seed number 606 is the same.

It should be noticed that it is not necessary to store the complete the initialization vector 612, the encryption key 622, or the seed number 606, in the RMD, as long as the missing parts of them are available when restoring the original data.

A seed number 606 may be a combination of a software generated part and a PIN code which the user has to enter. Then it is necessary to store only the software generated part in the RMD.

If a logical block number of the LMD 305 is available, it is preferably used as the unique ID number 619. Alternatively, the unique ID number 619 can be, for example, a timestamp. It should be noted that whenever the ID 619 is generated from any kind of unique information available during a read operation, there is no need to save the ID 619 to the LMD 305. When the ID 619 is generated for the read operation, the generated ID 619 is sent to the RMD 304 which uses it as a search key for retrieving the removed portion 618.

Generally speaking, the ID 619 can be generated using unique information relating to the ciphertext block 615 or a plaintext file, or another type of data. For example, a file name of the plaintext file can be stored in a lookup table, after which the index of the lookup table can be used as the ID 619. Alternatively, a hash function can be utilized in various ways to result in the ID 619.

Values of the initialization vector 612 and the encryption key 622 can be generated in the terminal, but data security is improved, when the values are generated at a well-secured server. For example, at a server which provides the access to the RMD 304. Then generated values are transferred over the network to the terminal and stored in a memory of the terminal. The generated values may be single-use values, i.e. they can be used only one read or write operation.

Alternatively, values of the initialization vector 612 and the encryption key 622 may be generated from last encryption results or from practically any non-predictable value available to the software environment of the mobile terminal.

Figure 7:
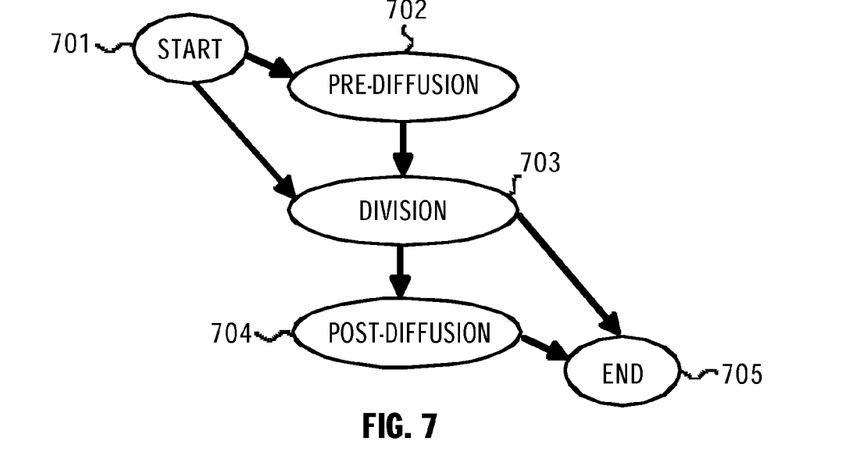
FIG. 7 depicts preferred phases of the write operation.

FIG. 7 depicts phases of the write operation. The write operation comprises at least a phase of division 703 which is performed between the start 701 and the end 702 of the write operation. For example, the data division 616 in FIG. 6 can be understood as the phase of division 703. If only the phase of division 703 is performed, the original data is secured, but not in the best possible way.

Encryption is preferably used in the write operation to enhance the data security of a plaintext. For example, an encryption method, such as Corrected Block Tiny Encryption Algorithm, familiar to a person skilled in the art, "diffuses" the plaintext so that one bit difference in the plaintext causes approximately 32 bit differences in the ciphertext when using 64 bit blocks.

Generally speaking, we mean by the term "diffusion" use of an encryption method. However, the method utilized in the write operation is not necessarily such method which is understood as an encryption method in the prior art.

Let us consider the phase of division 703 shown in FIG. 7. The phase of division 703 divides data into at least two portions when it removes bits in a certain manner. The removal of bits essentially enhances the data security. Therefore, because of the removal of bits, the encryption method utilized in the write operation may be relatively insecure as such, as mentioned in the background of the invention.

The bits can be removed from a plaintext, but the data security is better, if the bits are removed from a ciphertext. For example, in FIG. 6 the bits are removed from the ciphertext 615.

By the term "pre-diffusion" we refer to at least one phase which is performed prior to the phase of division 703.

By the term "post-diffusion" we refer to least one phase which is performed after the phase of division 703.

In the write operation depicted in FIG. 7 a phase of pre-diffusion 702 and a phase of post-diffusion 704 are optional phases of which either one or both can be performed. The phase of pre-diffusion and the phase of post-diffusion may comprise a number of sub-phases.

Figure 8:
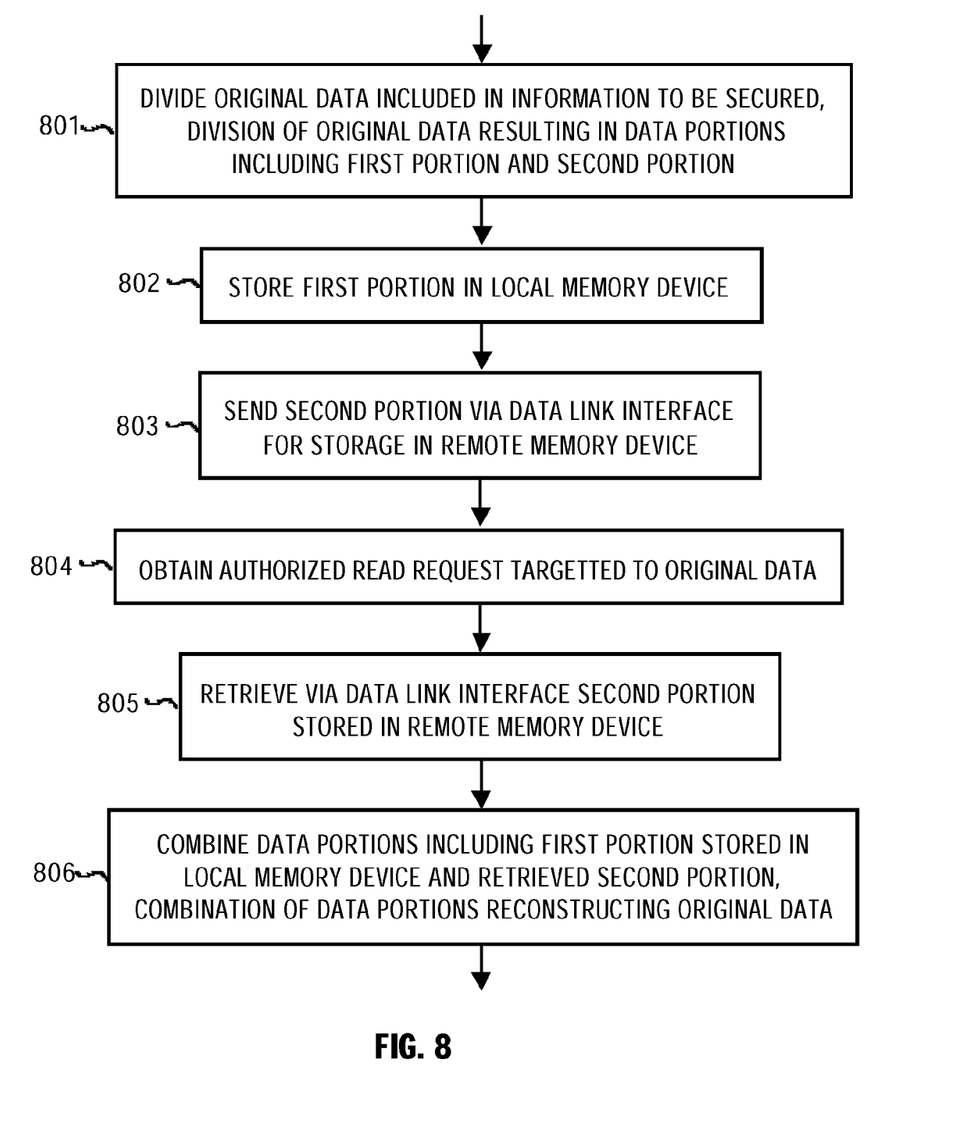
FIG. 8 shows a method for securing data.

FIG. 8 shows a method for securing information in a local memory device which is coupable to a terminal having a data link interface. The method comprises steps 801-806 to be performed at the terminal.

The method divides 801 original data included in the information to be secured, a division of the original data resulting in data portions including a first portion and a second portion.

The method stores 802 the first portion in the local memory device and sends 803 the second portion via the data link interface for storage in a remote memory device.

When an authorized read request targeted directly or indirectly to the original data is obtained 804, the method reconstructs the original data responsive to the authorized read request.

In more detail, the method retrieves 805 via the data link interface the second portion stored in the remote memory device and combines 806 the data portions including the first portion stored in the local memory device and the retrieved second portion, wherein a combination of the data portions reconstructs the original data.

Preferably, the data link interface comprises a capability to communicate with a network server. In more detail, the terminal communicates with network server via the data link interface and via a network to which the network server is coupled. The terminal may or may not be a mobile terminal.

Optionally, prior to the step of obtaining 804, the method further comprises the following steps. The method receives at the terminal a read request targeted to the original data and authorizes the read request at the network server resulting in the authorized read request. If the authorization of the read request fails, the steps 805 and 806 are not performed, i.e. the method omits the steps 805 and 806.

Preferably, the step of sending 803 is performed so that the second portion is sent via the network server.

Preferably, the step of retrieving 805 is performed so that the second portion is retrieved via the network server.

The first portion of the original data is preferably stored by a device driver of the terminal. The device driver 235 shown in FIG. 2 is an example of the device driver of the terminal.

Optionally, the step of dividing 801 is performed utilizing a pseudorandom number generator which generates each time an identical bit sequence when obtaining a same seed data as an input.

Regarding to the last-mentioned option, the combination of the data portions is preferably at least partly based on use of the pseudorandom number generator and the identical bit sequence generated by it.

Further, regarding to the last-mentioned option, the method comprises the following steps to be performed at the terminal. The method sends at least a part of the seed data of the pseudorandom number generator via the data link interface to the remote memory device to be stored therein, and responsive to the authorized read operation, the method retrieves via the data link interface the part of the seed data from the remote memory device and regenerates the seed data, utilizing the received part of the seed data.

Preferably, the method comprises a step of encrypting the original data at the terminal, if the original data is not yet encrypted. This step of encrypting is related to decryption data of which at least one data item is selected from a list consisting of an encryption key, a decryption key, and an initialization vector.

Regarding to the step of encrypting, the combination of the data portions is preferably at least partly based on use of a decryptor by inputting the decryption data into the decryptor.

Further, regarding to the step of encrypting, the method comprises the following steps to be performed at the terminal. The method sends at least a part of the decryption data via the data link interface to the remote memory device to be stored therein; and responsive to the authorized read operation, the method retrieves via the data link interface the part of the decryption data from the remote memory device.

When using encryption, the step of encrypting is preferably performed prior to the step of dividing 801.

The method of FIG. 8 is thus intended for securing information in the local memory device. This local memory device is preferably a mobile terminal memory or a portable memory device.

The terminal shown in FIG. 2 is preferably capable to perform the above-described steps of the method.

Lastly, some optional details of the method and the terminal are discussed.

The problem of data security especially concerns a mobile terminal which is used outside of an office, a home, or another unlocked room.

It is possible to buffer all data in the mobile terminal prior to sending the data to the RMD. The buffer can then be used as a local cache in a so-called "immediate read operation". The local cache related the immediate read operation usually enhances the performance of the mobile terminal and the user experience.

The immediate read operation is data security risk, if it can be performed without an access to the RMD. Therefore, the use of the buffer, i.e. the use of the local cache, should require the access to the RMD even if the removed portion of the original data is not retrieved from the RMD, but from the local cache.

Because the buffer contains data to be secured, the content of the buffer should be destroyed or moved to the network server when the buffer is not used anymore.

Alternatively, it is possible to use an expiration time. The buffer is to be erased after the pre-set expiration time.

Alternatively, the buffer can be erased in response to an erasure command originated from a management server or transmitted via the management server.

The management server can enhance data security so that the management server maintains location-based access restrictions. In more detail, the management server has a list of safe (or unsafe) access locations, such as IP addresses, where a mobile terminal is (or is not) allowed to communicate with RMD.

If a request concerning missing data arrives from an unauthorized location, the missing data would not be sent to the mobile terminal, because the request indicates an unauthorized usage attempt. Then the management server may send the erasure command to the mobile terminal in order to erase of content of the LMD.

It will be appreciated that the invention is not limited to what has been described herein above merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

The invention claimed is:

1. A method for securing information in a local memory device, the method comprising the following steps:
coupling the local memory device to a first terminal,
generating a first pseudorandom bit stream in response to a seed data,
dividing original data included in the information to be secured to a first portion and a second portion, wherein the second portion is formed by removing from the original data the bits corresponding to selected bits of the pseudorandom bit stream, and the first portion is formed from the remaining bits of the original data;
storing the first portion in the local memory device;
sending the second portion and the seed data via a data link interface for storage in a remote memory device connected to a network server;
removing the local memory device from the first terminal;
coupling the local memory device to a second terminal;
receiving a read request at the second terminal targeted to the original data;
sending to the server the read request for obtaining the second portion and the seed data;
upon a successful access rights authentication of the read request at the server resulting in an authorized read request, retrieving via a data link interface the second portion and the seed data stored in the remote memory device;
combining, in the second terminal, the first portion stored in the local memory device and the retrieved second portion by placing the bits of the second portion into their original positions among the bits in the first portion in conformity with the selected bits of a second pseudorandom bit stream generated, in the second terminal, in response to the seed data, wherein the combination of the first and second portions reconstructs the original data; wherein the first and the second pseudorandom bit streams are identical; and
upon failure of the access rights authentication of the read request due to receiving the read request from the second terminal located at an unauthorized location, the server sends an erasure command to the second terminal in order to erase the first portion from the local memory device.

2. The method as claimed in claim 1, wherein the step of storing is performed so that the first portion is stored by a device driver of the terminal.

3. The method as claimed in claim 1, further comprising the following steps
at the first terminal:
sending at least a part of the seed data of the pseudorandom number generator via the data link interface to the remote memory device to be stored therein;
at the second terminal
responsive to the authorized read operation,
retrieving via the data link interface the part of the seed data from the remote memory device; and,
regenerating the seed data, utilizing the received part of the seed data.

4. The method as claimed in claim 1, further comprising a step of encrypting the original data at the first terminal, the step of encrypting being related to decryption data of which at least one data item is selected from a list consisting of an encryption key, a decryption key, and an initialization vector.

5. The method as claimed in claim 1, wherein the combination of the first and second portions is at least partly based on use of a decryptor by inputting the decryption data into the decryptor.

6. The method as claimed in claim 1, further comprising performing the following steps
at the first terminal:
sending at least a part of the decryption data via the data link interface to the remote memory device to be stored therein; and,
at the second terminal
responsive to the authorized read operation,
retrieving via the data link interface the part of the decryption data from the remote memory device.

7. The method as claimed in claim 4, wherein the step of encrypting is performed prior to the step of dividing.

8. The method as claimed in claim 1, wherein the local memory device is a mobile terminal memory or a portable memory device.

9. A terminal for securing data in a local memory device, the terminal comprising:
a data link interface;
a pseudorandom number generator for generating a first pseudorandom bit stream in response to a seed data;
a bit stream divider for dividing original data into at least a first data portion and a second data portion wherein the second data portion is formed by removing from the original data the bits corresponding to selected bits of the pseudorandom bit stream, and the first data portion is formed from the remaining bits of the original data, storing the first data portion in the local memory device, and sending the second data portion and the seed data via the data link interface for storage in a remote memory device;
a bit stream combiner, responsive to a read operation request targeted to the original data, for retrieving, upon a successful access rights authentication of the read operation request at a server resulting in an authorized read request, via the data link interface the second data portion and the seed data stored in the remote memory device, for combining the retrieved second data portion and the first data portion stored in the local memory device coupled to the terminal by placing the bits of the retrieved second data portion into their original positions among the bits in the first data portion in conformity with the selected bits of a second pseudorandom bit stream generated, in the second terminal, in response to the seed data, wherein the combination of the first and second data portions reconstructs the original data, wherein the first and the second pseudorandom bit streams are identical; and upon failure of the access rights authentication of the read request due to receiving the read request from the terminal located at an unauthorized location, the server sends an erasure command to the terminal in order to erase the first data portion from the local memory device.

10. The terminal as claimed in claim 9, wherein
the data link interface sends a portion of the seed data to the remote memory device;
the data link interface receives the portion of the seed data from the remote memory device, responsive to an authorized read operation; and
the bit stream combiner regenerates the seed data utilizing the received part of the seed data.

11. The terminal as claimed in claim 9, wherein the bit stream divider generates by a pseudorandom number generator pseudorandom numbers which are sent to the remote memory device to be stored therein.

12. The terminal as claimed in claim 11, wherein the bit stream combiner uses during the combination of the first and second data portions the pseudorandom numbers which are retrieved from the remote memory device.

13. The terminal as claimed in claim 9, further comprising an encryptor coupled to the bit stream divider, for encrypting the original data; and, a decryptor coupled to the bit stream combiner, wherein the decryptor requiring decryption data to decrypt data.

14. The terminal as claimed in claim 13, wherein
the data link interface sends at least a part of the decryption data for storage in the remote memory device; and,
wherein the data link interface receives the part of the decryption data from the remote memory device responsive to the authorized read operation.

15. The terminal as claimed in claim 13, wherein the encryptor is coupled to the input of the bit stream divider, and wherein the decryptor is coupled to the output of the bit stream combiner.

16. The terminal as claimed in claim 9, wherein the local memory device is a mobile terminal memory or a portable memory device.

17. The terminal as claimed in claim 9, wherein a device driver is capable of erasing the first data portion from the local memory device.

18. The terminal as claimed in claim 17, wherein the device driver erases the first data portion when an expiration time associated to the local memory device is reached.

19. The terminal as claimed in claim 17, wherein the device driver erases the data in response to an authorized erasure command received via the data link.

20. The terminal as claimed in claim 13, further comprising at least one processing unit operating under software control, and wherein at least one of the components selected from the least consisting of the bit stream combiner, the bit stream divider, the encryptor, the decryptor, and a device driver, or portions or combinations thereof, are implemented utilizing the processing unit.

* * * * *